United States Patent Office 3,392,161
Patented July 9, 1968

3,392,161
GEL-FREE HALOGENATED POLYBUTADIENE
RUBBER-RESINS
Heinz Uelzmann, Cuyahoga Falls, Ohio, assignor to The
General Tire & Rubber Company, Akron, Ohio, a corporation of Ohio
No Drawing. Filed Oct. 15, 1964, Ser. No. 404,157
6 Claims. (Cl. 260—94.7)

ABSTRACT OF THE DISCLOSURE

Solvent soluble or gel-free halogenated polybutadiene rubber-resin products containing at least 40% by weight of halogen can be obtained by reacting with a brominating or chlorinating agent a cis-1,4-polybutadiene having above a 75% cis-1,4-configuration in a solvent comprising an aromatic hydrocarbon having at least one —$NO_2$ group.

---

This invention relates to new and useful halogenated rubber-resins and, more particularly, to gel-free halogenated polybutadiene rubber-resins prepared from cis-1,4-polybutadiene rubber and from trans-1,4-polybutadiene rubber.

It is known that certain halogens react with various kinds of rubbers to form products which are known as halogenated rubber-resins. For instance, rubber-resins are described on pages 617 to 627 of the textbook, "Synthetic Rubber," by G. S. Whitby, prepared under the auspices of the Division of Rubber Chemistry, American Chemical Society, 1954 edition, published by John Wiley & Sons, Inc., New York, N.Y.

In general, polybutadienes can be chlorinated in the presence of chloroform, ethylene dichloride or chlorobenzene as the solvent. However, the halogenated polybutadiene rubber-resins formed have, in the past, contained unduly large amounts of gel which must be removed before the remaining product can be dissolved in solvents such as acetone or aromatic hydrocarbons for use in coatings, varnishes, lacquers and paints.

With the advent of Ziegler-type catalysts and similar catalytic systems such as the Natta catalyst complexes, the problem of producing gel-free halogenated polybutadiene rubber-resins has been all the more severe. This has been particularly found to be the case for halogenated (especially chlorinated) cis-1,4-polybutadiene and trans-1,4-polybutadiene.

In accordance with the present invention, the foregoing disadvantages are overcome and an improved process for the preparation of gel-free halogenated polybutadiene rubber-resins has now been discovered wherein polybutadiene of above 75%, preferably above 85%, and even more especially above or about 95% cis- or trans-isomeric configuration, is halogenated with chlorine and/or bromine in the presence of either benzene (in the case of trans-polybutadiene) or nitrobenzene (in the case of cis-polybutadiene), as opposed to the use of chlorobenzene of the prior art. By the process of the invention, gel-free, soluble, resinous, halogenated polybutadienes of at least about 40% by weight and preferably at least 50% by weight halogen content, are formed. Such new and useful halogenated polybutadiene rubber-resins are tough, durable, compatible with plasticizers, and soluble in such solvents as benzene, chloroform, carbon disulfide, carbon tetrachloride, etc., which versatility permits the use thereof in a wide variety of commercial applications.

It is an object of the invention to provide an improved process by which new and useful gel-free, aromatic hydrocarbon-soluble, halogen-containing cis- and trans-1,4-polybutadiene rubber-resins may be prepared.

Other objects and advantages of the present invention will become apparent to those skilled in the art as the description thereof continues.

In practicing the present invention, a trans- or cis-polybutadiene is halogenated in the presence of a solvent selected from the group consisting of benzene, nitrobenzene and mixtures thereof. Procedures according to the invention for halogenating cis- or trans-polybutadiene to form halogenated polybutadiene rubber-resins comprise contacting the polymer dissolved in the foregoing solvents with such halogens as chlorine and bromine and/or materials capable of yielding such halogens in situ, such as, for example, sulfuryl chloride.

By a preferred process of the invention, halogenation of polybutadiene rubber is effected by passing a liquid or gaseous elemental halogen, preferably chlorine, into a solution of cis-1,4- or trans-1,4-polybutadiene polymer dissolved in a solvent such as aforementioned, preferably with agitation and under an inert atmosphere. For best results, in the case of cis-1,4-polybutadiene, the polymer-solvent preferably is a nitro-aromatic hydrocarbon, such as, for example; nitrobenzene, ortho-dinitrobenzene, o-nitrobenzene, para-nitrobenzene, 2,4-dinitrobenzene, 4,4'-dinitrobiphenyl, and the like and mixtures thereof, or one or more nitro-aromatic hydrocarbons admixed with a minor proportion of an aromatic hydrocarbon. For trans-1,4-polybutadiene, the polymer-solvent preferably is an aromatic hydrocarbon, such as, for example, benzene, toluene, xylenes, or trimethyl benzene, mixtures thereof, and/or the before-mentioned nitro-aromatic hydrocarbon solvents, etc.

Various amounts of solvents are suitable, such as solvent solutions containing from 0.3 to 50.0 percent, preferably from 0.5 to 25.0 percent, and even more especially from 0.5 to 20.0 percent butadiene polymer. Most advantageously, the polymer is mixed with the solvent to obtain an 0.5 to 15.0 percent solution, whereas a solution of about 1 to 10 percent is most often employed.

Generally, the halogenation reaction is carried out at reaction temperatures of 0° C. to 100° C., preferably from 10° to 65° or 80° C., provided these temperatures do not exceed the decomposition temperature of the polybutadiene polymer.

During halogenation, atmospheric pressure may be employed, although pressures from about 0.5 to 20.0 to 100 atmospheres absolute can be employed, the most desirable pressures being from 1 or 2 to 10 atmospheres. When halogenating near or at the boiling point of the solvent, it is desirable to employ superatmospheric pressures or to reflux the solvent vapors to prevent loss of solvent. The reaction time can be extremely short since chlorine reacts substantially completely with polybutadiene almost instantaneously.

The halogen-containing polybutadiene rubber-resin product may be separated from the solution by evaporating the solvent. Evaporation may be effected by placing the halogenated polymer in an oven or by passing the wet polymer through heated rollers, the temperature of evaporation being below the decomposition temperature of the polymer. Another method for solvent removal comprises precipitating the polymer by means of an alcohol, such as isopropyl, methyl and/or ethyl alcohol.

The halogen-containing rubber-resin thus obtained is completely free of gel and may be re-dissolved in benzene, xylol, naphtha, etc. The product also dissolves easily in carbon tetrachloride, chloroform or ethylene dichloride and compatible products when combined with plasticizers.

The chlorine-containing polybutadiene rubber-resins of the present invention have a chlorine content of at least 40 weight percent and preferably at least 50 weight percent based on polymer. Generally speaking, compositions containing higher contents of chlorine are harder and more resinous; while those having less chlorine content are more rubbery.

The unhalogenated polymer, which is used as the starting material in the process of the present invention, is prepared by well-known methods, as, for example, by polymerizing at from −15° C. to +75° C., cis- and trans- (depending on the polymer desired) 1,3-butadiene-monomer in the presence of from about 0.01 to 0.50 mole percent based on polymer of such catalysts, as, for example, Ziegler catalysts which may, for instance, be a combination of titanium tetrachloride and triisopropyl aluminum, vanadium tetrachloride and triisobutyl aluminum (preferably in the ratio of about 1:3 to 1:10) or in the presence of about 0.01 to 0.50 mole percent based on polymer of such other Ziegler catalyst complexes as titanium tetraiodide and triisobutyl aluminum (preferably also in the ratio of about 1:3 to 1:10) to give a polymer, depending on the catalyst used, high in trans- or cis-configuration.

During halogenation of the polybutadiene rubber to produce halogen-containing, gel-free polybutadiene rubber-resins, a solvent is normally present. When utilizing the titanium tetraiodide and trialkyl aluminum catalyst, the polymer formed is found to comprise a high proportion of polymer with cis-configuration; whereas while utilizing the vanadium tetrachloride and trialkyl aluminum catalyst for polymerization, the polymer is found to comprise a high proportion of trans-configuration. The most desirable polymers of the present invention comprise at least about 80 mole percent, preferably 90 mole percent and even more especially 95 mole percent or more, based on polybutadiene polymer, of either trans- or cis-configuration.

The resulting halogen-containing polybutadiene rubber-resins of the invention may be compounded with the usual rubber-resin compounding materials such as fillers, pigments, zinc oxide, resins, rubbers, asphalts, cracked wax-distillates, dyes, fire resistant materials, plasticizers, etc.

The following examples are intended to illustrate the present invention with more particularity to those skilled in the art, it being understood that the examples are for purposes of illustration only and are not to be construed as limiting the present invention:

EXAMPLE I

Part A (preparation of trans-1,4-polybutadiene)

A catalytic solution of 1.56 grams of vanadium tetrachloride and 1.78 grams of triisobutyl aluminum is dispersed in 134.38 grams of toluene to form a black colloidal dispersion which is added to a sealed polymerization reactor and 60 grams of butadiene-1,3 monomer are introduced into the reactor under a nitrogen atmosphere at 25° C. and a pressure of one atmosphere. Polymerization begins after two minutes.

After 24 hours, 20 cc. of isopropyl alcohol and 20 cc. of benzene are poured into the polymeric reaction mixture whereby the catalyst is destroyed and the reaction is stopped. The total yield of polymer, which is 91 percent trans-1,4-polybutadiene, is 44 grams (i.e., 73 percent conversion).

Part B (chlorination of trans-1,4-polybutadiene at room temperature)

A portion (i.e., 22 grams) of the product of Part A is dissolved in benzene to obtain a 1.5 percent solution. Chlorine gas then is bubbled through the solution for 15 minutes at 25° C. and atmospheric pressure until an opaque yellowish solution is formed. To this solution then is added an excess of isopropyl alcohol to precipitate the polymer. The polymer is dried at 100° C. in a vacuum oven. A hard, brittle, chlorine-containing trans-1,4-polybutadiene rubber resin is obtained. The resin is redissolved in benzene and no gel is obtained. The halogen-containing trans-1,4-polybutadiene rubber-resin formed is found to have a chlorine content of 52.4 percent and relative viscosity of 1.13.

Part C (chlorination of trans-1,4-polybutadiene at an elevated temperature)

The remainder of the trans-1,4-polybutadiene from Part A is chlorinated for 10 minutes as described in Part B except that the temperature is raised to 50° C. during chlorination. The resulting chlorine-containing rubber-resin is found to have a chlorine content of 51.55 percent, a relative viscosity of 1.134 and is soluble in xylol.

When the chlorination of trans-1,4-polybutadiene rubber, whether conducted at room or elevated temperature, is carried out in chloroform instead of benzene, a gelled polymer which is insoluble in aromatic hydrocarbons is obtained.

EXAMPLE II

Part A (cis-1,4-polybutadiene chlorination in nitrobenzene)

A butadiene polymer of 95 mole percent cis-1,4-configuration weighing 6.5 grams is prepared by the use of a titanium tetraiodide-triisobutyl aluminum catalytic complex wherein the polymer is dissolved in nitrobenzene to form a 3.5 weight percent solution. The polymeric solution in nitrobenzene is chlorinated at 40° C. and one atmosphere pressure absolute by bubbling chlorine gas through the solution. After five minutes the solution turns a yellowish color, which indicates the completion of the chlorination reaction. The chlorinated polymer is precipitated in excess isopropanol and 40 cc. of a saturated solution of sodium bisulfite is added to neutralize free chlorine. The polymer then is placed in a beaker of benzene, re-dissolved, filtered, re-precipitated in isopropanol and placed in an oven and dried in vacuo.

After drying, the resulting chlorine-containing cis-1,4-polybutadiene rubber-resin weighs 16 grams (a gain of 9.5 grams), the resin melting point being 150° C. The resin product is a light brown, hard solid containing 54.86 percent chlorine. Theoretically, the maximum amount of chlorine which can be added to the cis-1,4-polybutadiene is 56.04 percent and therefore the chlorination is over 97 percent complete.

Part B (cis-1,4-polybutadiene chlorination in chloroform)

A 3 percent solution of the unchlorinated cis-1,4-polybutadiene of Part A of this example is chlorinated in a solution of chloroform by bubbling $Cl_2$ gas through the solution for 15 minutes at atmospheric pressure. A precipitate is formed after a few minutes and upon drying, a hard, tough, insoluble material is obtained. An attempt is made to dissolve the chlorinated product in 2, 5 and 10 percent concentrations of dimethyl formamide and cyclohexane, respectively. The chlorinated product does not dissolve, but rather becomes swollen up with each organic solvent. The chlorinated product also is insoluble in benzene.

The above example illustrates that when the chlorination of cis-1,4-polybutadiene is carried out in nitrobenzene, a soluble, chlorinated product is obtained, whereas when the chlorination is performed in chloroform, an insoluble, gel-containing product is produced.

EXAMPLE III

Part A (compatibility of non-halogenated trans-1,4-polybutadiene with plasticizer)

A 3 percent solution in benzene of the halogen-free trans-1,4-polybutadiene in Example I, Part A, is prepared. 67 grams of the resulting solution are mixed with 0.5 gram of a chlorinated biphenyl plasticizer (Aroclor 1254) and cast into films. The films obtained are turbid, demonstrating that the components of the films are not compatible.

Part B (compatibility of halogenated trans-1,4-polybutadiene with plasticizer)

The above plasticizer solution is chlorinated by bubbling chlorine gas through the same at 25° C. and atmospheric pressure for five minutes at which time a yellow color appears. The temperature rises to 60° C. during the chlorination. The films obtained from the plasticized, chlorinated trans-1,4-polybutadiene polymer are clear and hard, indicating that the components of the films are compatible.

EXAMPLE IV

Part A (preparation of trans-1,4-polybutadiene)

A catalytic solution of 1.4 cc. of vanadium tetrachloride and 17.7 cc. of tri-n-octyl aluminum in 300 cc. of benzene is combined with 25 cc. of 1,3-butadiene monomer in a sealed reactor containing a nitrogen atmosphere at 25° C. and one atmosphere pressure. The reaction mixture is stirred for 3 minutes and until there is sufficient solid trans-1,4-polybutadiene to substantially prohibit stirring. After 15 minutes, 10 cc. of ethanol is added to destroy the catalyst and thus stop the reaction.

The reactor is unsealed, additional benzene added, and a solution of 0.1 gram of phenyl-beta-naphthylamine, 0.1 gram of 1,2-dihydro-2,2,4-tri-methylquinoline antioxidant, and 100 cc. of heptane added.

The trans-1,4-polybutadiene formed is re-precipitated in an equal volume of ethanol, the wash liquid being decanted and the polymer dried in a vacuum oven. A fibrous, fluffy, light material is obtained which is soluble in carbon tetrachloride.

Part B (chlorination of trans-1,4-polybutadiene)

4 grams of trans-1,4-polybutadiene obtained in Part A of this example are dissolved in benzene to obtain a 3 percent solution, filtered to remove any gel, and chlorinated by bubbling chlorine gas through the solution for 5 minutes, in the absence of light. Nitrogen then is bubbled through the solution to remove any excess chlorine and 20 cc. of pyridine are added to neutralize free chlorine not removed by the nitrogen. An excess of ethanol is added to precipitate the chlorinated trans-1,4-polybutadiene.

After washing and drying in a vacuum oven, a tan colored, tough, flexible chlorine-containing rubber-resin which is soluble in benzene is obtained.

EXAMPLE V

Part A (preparation of trans-1,4-polybutadiene)

A catalytic solution of 0.7 cc. of vanadium tetrachloride and 4.0 cc. of triisobutyl aluminum in 50 cc. of toluene is added to a polymerization reactor. The two catalyst components form a brownish-black solution with evidence of some precipitation. The reactor is sealed, air evacuated, nitrogen introduced, and 25 cc. of gaseous 1,3-butadiene monomer added with stirring, at 25° C. and one atmosphere pressure absolute. The monomer is polymerized by the catalyst solution. After 3 minutes of monomer addition, the previously opaque brownish-black solution is transparent and greenish and a dark-brown precipitate of the polymer has settled out. Most of the solvent is soaked up by the polymer.

After 2 hours the catalyst is destroyed and the reaction stopped by injecting a solution of 20 cc. of isopropyl alcohol and 20 cc. of benzene into the polymeric reaction mixture.

Part B (chlorination of trans-1,4-polybutadiene)

The product prepared as described in Part A of this example is dissolved in benzene to obtain a 3 percent solution. It is then centrifuged to remove impurities and the clear yellow solution is used during chlorination. Chlorine gas is bubbled through the trans-1,4-polybutadiene solution for 5 minutes at which time reaction is complete. The benzene solvent is evaporated at 100° C. in an oven and a hard, brittle, chlorinated trans-1,4-polybutadiene rubber-resin is formed. No gel is obtained when this rubber-resin is redissolved in benzene. The chlorine-containing trans-1,4-polybutadiene rubber-resin is easily dissolved in chloroform.

Resort may be had to modifications and variations without departing from the spirit of the invention or the scope of the appended claims.

What is claimed is:

1. The method of making a solvent soluble halogenated polybutadiene rubber-resin which comprises halogenating a cis-1,4-polybutadiene having above 75% cis-1,4-configuration dissolved in a solvent comprising an aromatic hydrocarbon containing at least one —$NO_2$ group at a temperature of from about 0 to 100° C. with a halogenating agent selected from the group consisting of chlorinating agents and brominating agents and in an amount sufficient to provide said polybutadiene with a halogen content of at least about 40% by weight.

2. The method according to claim 1 in which said halogenating agent is chlorine and in which said cis-1,4-polybutadiene has above 85% cis-1,4-configuration.

3. The method according to claim 1 in which said halogenating agent is chlorine and in which said cis-1,4-polybutadiene has above 95% cis-1,4-configuration.

4. A method of halogenating rubbery cis-1,4-polybutadiene having at least about 85% cis-1,4-configuration which comprises contacting a solution of said polybutadiene dissolved in an aromatic hydrocarbon containing at least one —$NO_2$ group with a halogen selected from the group consisting of chlorine, bromine and mixtures thereof at a temperature of from about 10 to 80° C., said halogen being used in an amount sufficient to provide said polybutadiene with a halogen content of at least about 40% by weight.

5. A method according to claim 4 wherein the solvent is nitrobenzene and wherein the halogenation reaction is conducted at a temperature of from about 10 to 65° C.

6. The product produced by the method of claim 1.

References Cited

UNITED STATES PATENTS

| 2,943,988 | 7/1960 | Canterino | 260—163 |
| 2,511,605 | 6/1950 | Tinsley et al. | 260—83.3 |
| 3,293,226 | 12/1966 | De Schvijver | 260—85.1 |

JOSEPH L. SCHOFER, *Primary Examiner.*

W. F. HAMROCK, *Assistant Examiner.*